United States Patent
Wagner et al.

(10) Patent No.: US 11,958,556 B2
(45) Date of Patent: Apr. 16, 2024

(54) ASSEMBLY TOOL FOR THE ASSEMBLY OF A WINDOW PANE IN A WINDOW FRAME OF A VEHICLE

(71) Applicant: Ford Global Technologies, LLC, Dearborn, MI (US)

(72) Inventors: Marvin Wagner, Cologne (DE); Daniel Zwetkow, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 841 days.

(21) Appl. No.: 17/082,735

(22) Filed: Oct. 28, 2020

(65) Prior Publication Data

US 2021/0122435 A1  Apr. 29, 2021

(30) Foreign Application Priority Data

Oct. 28, 2019  (DE) .......................... 102019128958.0

(51) Int. Cl.
  *B62D 65/06*  (2006.01)
  *B25B 27/00*  (2006.01)
  *B60J 1/00*  (2006.01)

(52) U.S. Cl.
  CPC .............. *B62D 65/06* (2013.01); *B25B 27/00* (2013.01); *B60J 1/005* (2013.01)

(58) Field of Classification Search
  CPC ...... B62D 65/06; B62D 65/024; B25B 27/00; B60J 1/005
  See application file for complete search history.

(56) References Cited

U.S. PATENT DOCUMENTS

| | | | | |
|---|---|---|---|---|
| 2,305,995 A | * | 12/1942 | Roberts | B25B 27/023 29/256 |
| 6,453,531 B1 | * | 9/2002 | Krass | B25B 7/123 29/268 |
| 6,578,248 B1 | | 6/2003 | Boldizar | |
| 6,606,778 B1 | * | 8/2003 | Krass | B60J 1/005 29/464 |
| 7,818,863 B2 | * | 10/2010 | Maekawa | B62D 65/06 29/709 |
| 2011/0099795 A1 | | 5/2011 | Skluzak et al. | |
| 2013/0153725 A1 | | 6/2013 | Trudelle et al. | |
| 2013/0205578 A1 | * | 8/2013 | Glikis | B60J 1/005 269/95 |

FOREIGN PATENT DOCUMENTS

| | | |
|---|---|---|
| EP | 1826044 | 8/2007 |
| WO | 2014183602 | 11/2014 |

\* cited by examiner

*Primary Examiner* — Seahee Hong
(74) *Attorney, Agent, or Firm* — Burris Law, PLLC

(57) ABSTRACT

An assembly tool for assembly of a window pane in a window frame of a vehicle is provided. The assembly tool includes a tool body with a support for supporting and holding the tool body on a first edge of the window pane and a tool arm extending along a longitudinal axis. A distal end of the tool arm includes a distance gauge extending transversely to the longitudinal axis of the tool arm and configured to be inserted between a second, guided edge of the window pane and a pane guide part which guides the guided edge of the window pane within the window frame. The assembly tool also includes a push arm that is displaceable relative to the tool body and configured to clamp the tool body between the first edge of the window pane and a frame part of the window frame. The push arm is actuated by external force.

20 Claims, 2 Drawing Sheets

ASSEMBLY TOOL FOR THE ASSEMBLY OF A WINDOW PANE IN A WINDOW FRAME OF A VEHICLE

CROSS-REFERENCE TO RELATED APPLICATIONS

This application claims priority to and the benefit of German Application No. 102019128958.0, filed on Oct. 28, 2019. The disclosure of the above application is incorporated herein by reference.

FIELD

The present disclosure relates to an assembly tool for assembly of a window pane in a window frame.

BACKGROUND

The statements in this section merely provide background information related to the present disclosure and may not constitute prior art.

Assembly tools for assisting an assembly of a displaceable, in particular raisable and lowerable, window pane in a window frame of a vehicle, for example a vehicle door frame, are known in various configurations. By way of example, U.S. Pat. No. 6,578,248 B1 describes an assembly tool with which an unintentional and sudden downward movement of a window pane during assembly in a window frame of a vehicle door is prevented. To this end, the tool has suction cups which are fastened to a tool frame and which can be attached to the window pane with holding action, and also hook elements which can be inserted into a window channel of the vehicle door so as to hold the tool.

US 2013/0153725 A1 also discloses an assembly tool for fastening a window regulator to a frame of a vehicle door.

WO 2014/183602 A1 describes a fastening device for producing a secure connection between a window pane and a window regulator of a vehicle door.

A rod-shaped device for assisting an assembly of a windshield of a motor vehicle is furthermore disclosed in EP 1 826 044 A1. An end of the assembly device can be fastened to a window pane of a vehicle door. Another end of the device can be connected to the windshield to be assembled, in order to thus hold the windshield for easier assembly.

Another rod-shaped assembly tool for assembling a windshield on a vehicle is described in US 2011/0099795 A1. An end of the assembly tool can be fastened to a vehicle roof by way of a suction cup, and another end can be fastened to an engine hood.

The displacement of the window pane received in the window frame is usually brought about by a window regulating device which is known per se and to which the window pane is fastened, the window pane in turn being guided laterally in a displacement direction by the window frame. The window pane is preferably fastened to the regulating device by positively locking and/or frictionally locking connection, for example by clipping in, latching in, screwing and/or clamping. A combination of the abovementioned connection techniques is frequently used in order to connect the window pane, for example at a first fastening portion, to the regulating device in a positively locking manner and to fasten said pane, at another, second fastening portion, to the regulating device in a clamping connection, in order to make it possible to adjust or orient the window pane to a certain extent after it has been inserted in the window frame. Said adjusting or orienting is in particular required in the case of a motorized window regulating device in order to be able to realize an anti-pinch protection function of the window regulating device. For operationally reliable and proper functioning of the anti-pinch protection action and also for compliance with applicable anti-pinch protection standards (e.g. ECE R21 and FMVSS118), it is necessary for an upper edge of the window pane to be oriented as parallel as possible with respect to an upper frame part of the window frame, the upper pane edge being received in said upper frame part when the window pane is closed. In the case of an aforementioned combination of a positively locking and a clamping fastening of the window pane to the window regulator, the desired parallel orientation of the upper window pane edge with respect to the upper window frame part can be achieved as a result of corresponding tilting of the window pane about the fastening point of the window pane to the window regulating device, said fastening point being produced in a positively locking manner in a first assembly step. Following the parallel orientation thereof, it is possible, in a subsequent assembly step, to produce a clamping connection at the second fastening point of the window pane to the window regulating device.

SUMMARY

This section provides a general summary of the disclosure and is not a comprehensive disclosure of its full scope or all of its features.

The present disclosure provides an assembly tool which, with regard to an adjustment of the window pane in the window frame for ensuring an anti-pinch protection function and compliance with corresponding anti-pinch protection standards, simplifies and shortens time for an assembly of a window pane in a window frame of a vehicle, in particular in a window frame of a vehicle door. The working space for the adjustment and which correspondingly has to be provided is also reduced.

It should be pointed out that the features listed individually in the following description can be combined with one another in any technically expedient manner and show further configurations of the present disclosure. The description additionally characterizes and specifies the present disclosure in particular in connection with the figures.

It should also be noted that a conjunction "and/or" used herein between two features and linking these together should always be interpreted such that, in a first configuration of the subject matter according to the present disclosure, merely the first feature can be present, in a second configuration merely the second feature can be present and in a third configuration both the first and the second feature can be present.

In one form of the present disclosure, an assembly tool for the assembly of a window pane in a window frame, for example, when the window pane is received in a displaceable manner in the window frame of a vehicle, is provided. The assembly tool includes a tool body with a support for supporting and holding the tool body at a first edge of the window pane. On the tool body, there is held a tool arm which extends substantially along a longitudinal axis and which has, at a distal end thereof which is remote from the tool body, a distance gauge which extends away substantially transversely with respect to the longitudinal axis of the tool arm and which is configured to be inserted between a second, guided edge of the window pane and a pane guide part, which guides the guided edge of the window pane, of the window frame which receives the window pane in a displaceable manner. Furthermore, the assembly tool according to the present disclosure has a push arm which is held on the tool body so as to be displaceable relative thereto. The push arm is configured to clamp the tool body between the first edge of the window pane and a frame part of the window frame which receives the window pane in a displaceable manner. According to the present disclosure, the push arm is actuated by an external force (e.g., a push arm external force). In other words, the displacement of the push arm on the assembly tool is brought about not by the force of an operator using the assembly tool but rather by the force of a machine, for example of a motor, and which force can be generated for example in an electrical, pneumatic and/or hydraulic manner.

In some variations the displacement is understood to mean a linear movement (as opposed for example to a rotation, in which a movement takes place on a circular or elliptical path about a pivot point). In particular, the displacement of the window pane in the window frame can be brought about in a manner known per se by a (motor-operated) window regulating device, without however being limited hereto.

Furthermore, it should be noted that the frame part, which clamps the assembly tool against the first edge of the window pane, of the window frame which receives the window pane in a displaceable manner can be that frame part of the window frame which lies opposing or opposite of the first edge (in the case of a window pane already installed in the window frame). In this case, the frame part and the pane guide part of the window frame are different frame parts of the window frame. Although this corresponds to at least one variation of the present disclosure on account of the assembly tool being able to be clamped in a simple manner, the present disclosure is in no way limited hereto. For instance, with corresponding configuration of the push arm, clamping for example between the first edge of the window pane and the pane guide part of the window frame is likewise conceivable, in which case the frame part and the pane guide part of the window frame are identical frame parts.

The external force-actuated displacement of the push arm in combination with the distance gauge, which is inserted between the second, guided edge of the window pane and the pane guide part of the window frame during an assembly operation and which is used to set a defined spacing between the second edge of the window pane and a guide bottom of the pane guide part configured for example as a guide rail, affords the advantage that the assembly of the window pane in the window frame, in particular a motor-operated, raisable and lowerable window pane in a vehicle door of a motor vehicle, is simplified and shortened, since an adjustment of the window pane for ensuring an anti-pinch protection action, that is to say a precise parallel orientation of the first edge of the window pane with respect to that frame part of the window frame which receives said first edge in a closed state of the window pane, is carried out automatically and in the same reproducible manner and is for example not dependent on an operation of an operator using the assembly tool, which entails a certain degree of variation in the assembly results achieved. In any case, the range of such a result scatter can be reduced significantly by the clamping, brought about by the external force-actuated push arm, of the assembly tool between the window frame and the window pane, which in turn improves the adjustment of the window pane in the window frame and provides compliance with applicable anti-pinch protection standards. The external force actuation of the push arm for example enhances a desired clamping force which is the same for each assembly operation and which is exerted by the assembly tool during clamping thereof onto the window pane, with the result that, for example in the case of a fastening of the window pane to a window regulating device, which provides a frictionally locking clamping fastening technique for at least part of the window pane, a predefined, fastening position of the window pane on the window regulating device is achieved in a short assembly time.

The extension of the distance gauge transversely with respect to the longitudinal axis of the tool arm forms a substantially hook-shaped distal end of the tool arm. In some variations, the hook shape can be correspondingly adapted to a pane corner formed by the first and the second edge of the window pane in order to enhance a desired insertion of the distance gauge between the second window pane edge and the pane guide part of the window frame. By way of example, an inner radius of the transition from the distal end of the tool arm to the distance gauge can be adapted to or be complimentary with a rounding of the window pane corner.

In some variations, the tool arm is held on the tool body so as to be pivotable about a pivot axis. That is, after the assembly tool has been placed onto the first edge of the window pane, and possibly only after the assembly tool has been clamped by means of the push arm, the tool arm having the distance gauge can be inserted by pivoting between the second edge of the window pane and the pane guide part of the window frame, which further simplifies the handling of the assembly tool, and thus the assembly itself.

In some variations, the tool arm is also actuated by external force (e.g., a tool arm external force), that is to say that the pivoting of the tool arm is brought about by machine or by a motor having the same advantages as described above in connection with the push arm. The mechanized/motorized pivoting can be performed for example in an electrical, pneumatic and/or hydraulic manner.

In some variations the tool arm is actuated by an external force from a pivot motor which is arranged on the pivot axis, for example an electrically operated pivot motor. The pivot motor can be arranged on the pivot axis in a constructionally compact manner, such that the assembly tool also has a compact construction.

In at least one variation, the support has a support surface and the support surface provides the contact between the assembly tool and the first edge of the window pane and is of convex configuration. That is, the support surface is a convex shaped surface and the support having a protruding rounding is configured to permit a rolling movement of the support surface on the first edge of the window pane. The rolling movement can be utilized in order to for example tilt or rotate the assembly tool to a certain extent after it has been placed onto the first edge of the window pane. In this way, for example in the case of a tool arm which is attached to the tool body in a rotationally fixed manner, it is possible for the distance gauge to be introduced between the second edge of the window pane and the pane guide part of the window frame as a result of corresponding tilting of the entire assembly tool on the first edge of the window pane. The clamping of the assembly tool by way of the push arm can subsequently be carried out in the manner described above.

In some variations, the support is formed by a support cylinder which extends laterally from the tool body. The support cylinder has, at the distal end thereof, a terminating disk having a greater diameter than a diameter of the support cylinder. In other words, the support surface of the support is delimited laterally on the one hand by that part of the terminating disk which protrudes radially beyond the diameter of the support cylinder and on the other hand by the tool body itself. The lateral delimitation provides a guidance of the assembly tool on the first edge of the window pane.

In at least one variation, the tool arm can have an arm support for supporting and holding the tool arm at the first edge of the window pane. In this way, a desired (e.g., exact) insertion depth of the distance gauge between the second edge of the window pane and the pane guide part of the window frame can be provided, with the result that the gap, brought about by the distance gauge, between the second window pane edge and a pane guide bottom of the pane guide part has a defined width for a parallel orientation of the first edge of the window pane with respect to that frame part of the window frame which is assigned thereto.

In some variations, the tool body is substantially U-shaped. In such variations the push arm is received (disposed) in one of two free U limbs so as to be displaceable relative thereto, and a drive motor for the external force actuation of the push arm is received in the another of the two free U limbs. Also, a deflecting unit which couples the drive motor to the push arm in a drive force-transmitting manner is received in a connecting limb which connects the two free U limbs to one another. This furthermore provides a compact configuration of the assembly tool possible in spite of the linear displaceability of the push arm.

In at least one variation, at least one handle, for example two handles, is/are attached laterally, that is substantially transversely with respect to the displacement direction of the push arm, to the tool body.

Furthermore, in some variations a button for activating the external force actuation of the push arm, possibly also of the tool arm, is provided on the handle. In at least one variation another button is attached to the handle and provide an emergency stop function for the immediate deactivation of the external force actuation in order to increase the safety during the assembly.

In another form of the present disclosure, an assembly tool for assembly of a window pane received in a displaceable manner in a window frame of a vehicle includes a tool body having a support for supporting and holding the tool body on a first edge of the window pane and a tool arm having a longitudinal axis. The tool arm includes a distal end with a distance gauge extending transverse to the longitudinal axis, and the distal end is configured for insertion between a second edge of the window pane and a pane guide part of the window frame which guides the second edge of the window pane within the window frame. A push arm displaceable relative to the tool body is included and configured for clamping the tool body between the first edge of the window pane and a frame part of the window frame which receives the window pane in the displaceable manner. And the push arm is actuated by a push arm external force.

In some variations, the tool arm is pivotable about a pivot axis. And in at least one variation, the tool arm is actuated by a tool arm external force. For example, in some variations the tool arm is actuated by a tool arm external force from a pivot motor arranged on the pivot axis.

In at least one variation, a support surface of the support is a convex surface. And in some variations the support is a support cylinder extending laterally from the tool body. In such variations, the support cylinder can have a distal end with a terminating disk having a diameter greater than a diameter of the support cylinder.

In some variations, the tool arm includes an arm support configured to support and hold the tool arm on the first edge of the window pane.

In at least one variation, the tool body is a U-shaped tool body with two free U limbs and a connecting limb connecting the two free U limbs. In such variations, the push arm is disposed in one of the two free U limbs and can be displaceable relative to the one of the two free U limbs. Also, a drive motor can be disposed in another of the two free U limbs, and the drive motor can be configured to provide the push arm external force to the push arm. In some variations, a deflecting unit is disposed in the connecting limb and the deflecting unit couples the drive motor to the push arm in a drive force-transmitting manner.

In at least one variation, at least one handle is attached laterally to the tool body and a button can be included on the at least one handle. In such variations the button is configured for activating the push arm external force.

In still another form of the present disclosure, an assembly tool for assembly of a window pane received in a displaceable manner in a window frame of a vehicle includes a tool body with a support for supporting and holding the tool body on a first edge of the window pane, a tool arm having a longitudinal axis, and a push arm displaceable relative to the tool body. The tool arm has a distal end with a distance gauge extending transverse to the longitudinal axis and the distal end is configured for insertion between a second edge of the window pane and a pane guide part of the window frame which guides the second edge of the window pane within the window frame. Also, the tool arm is actuated by a tool arm external force. The push arm is configured for clamping the tool body between the first edge of the window pane and a frame part of the window frame which receives the window pane in the displaceable manner. Also, the push arm is actuated by a push arm external force.

In some variations, the tool arm is pivotable about a pivot axis and in art least one variation the tool arm is actuated from a pivot motor arranged on the pivot axis.

In still yet another form of the present disclosure, an assembly tool for assembly of a window pane in received in a displaceable manner a window frame of a vehicle includes a tool body having a support for supporting and holding the tool body on a first edge of the window pane. A tool arm having a longitudinal axis is included and the tool arm has a distal end with a distance gauge extending transverse to the longitudinal axis. The distal end is configured for insertion between a second edge of the window pane and a pane guide part of the window frame which guides the second edge of the window pane within the window frame, and the tool arm is actuated by a tool arm external force. A push arm displaceable relative to the tool body is also included and is configured for clamping the tool body between the first edge of the window pane and a frame part of the window frame which receives the window pane in the displaceable manner. And the push arm is actuated by a push arm external force.

In some variations, the support is a support cylinder extending laterally from the tool body and the support cylinder has a distal end with a terminating disk having a diameter greater than a diameter of the support cylinder.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
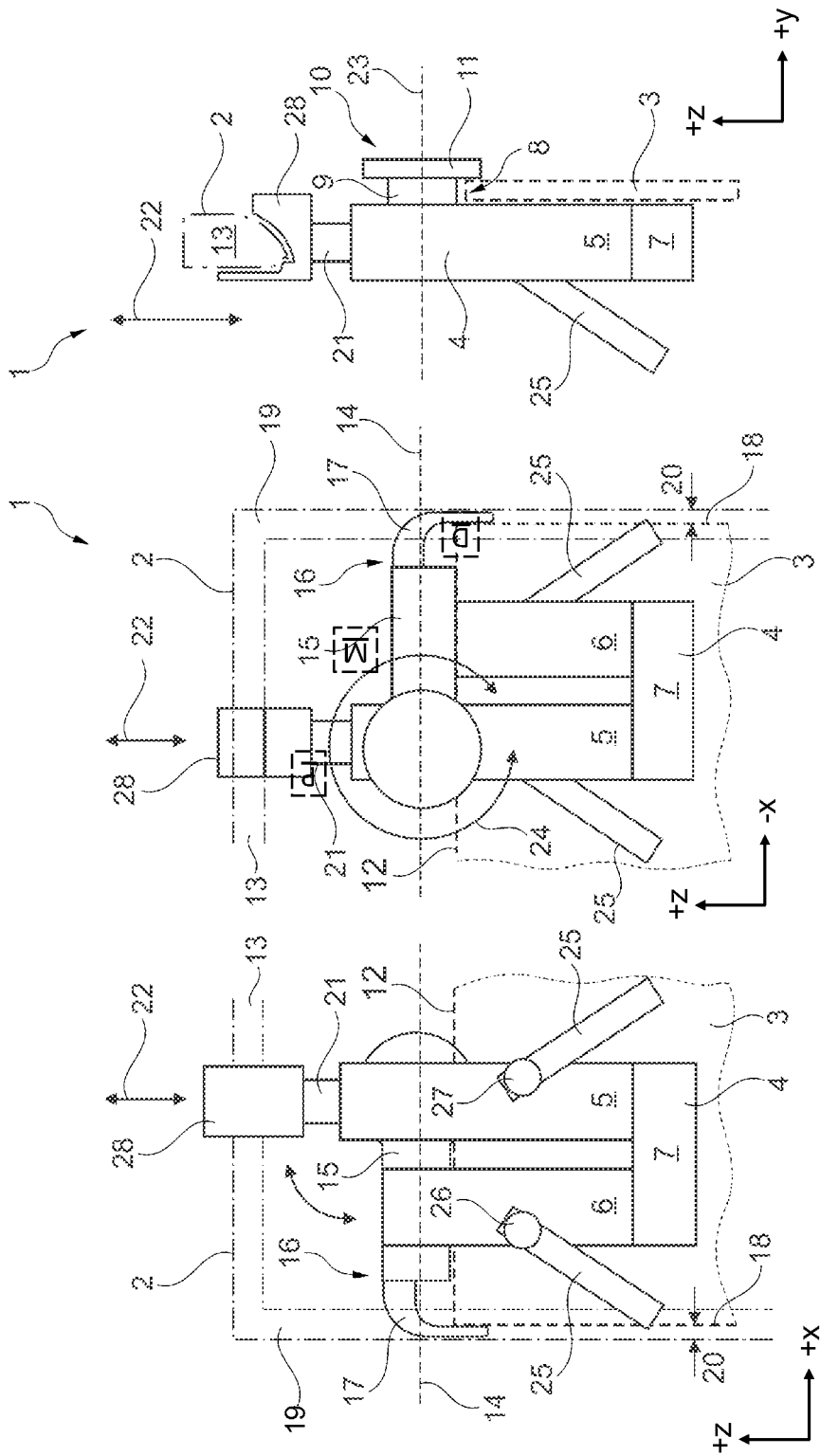
FIG. 1(a) shows a front view of an assembly tool according to one form of the present disclosure.
FIG. 1(b) shows a rear view of the assembly tool in FIG. 1(a)
FIG. 1(c) shows a side view of the assembly tool in FIG. 1(a)

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIGS. 1(a)-1(c) schematically illustrate a front view of an assembly tool 1 according to one form of the present disclosure in FIG. 1(a), a rear view of the assembly tool 1 in FIG. 1(b), and a side view of the assembly tool 1 in FIG. 1(c). The assembly tool 1 is used to assemble a window pane 3 in a window frame 2. The window pane 3 is received in a displaceable manner in the window frame 2, illustrated in part in FIG. 1, of a vehicle (not illustrated). As used herein, the phrase "in a displaceable manner" refers to a raisable and lowerable window pane in a window frame of a vehicle door. In some variations, the window frame 2 is part of a vehicle side door (not illustrated). The window pane 3 can be displaced upward (+z direction) and downward (-z direction) in the window frame 2 such that a window of the vehicle is "closed" and "opened", respectively. In at least one variation, a motorized window regulating device (not illustrated) is provided and the window pane 3 is fastened to the window regulating device by way of a lower edge (not shown) of the window pane 3.

As shown in FIGS. 1(a)-1(c), the assembly tool 1 has a substantially U-shaped tool body 4 with a first free U limb 5, a second free U limb 6 and a connecting limb 7 which connects the two free U limbs 5, 6 to one another. In some variations, a support 8 is included on the tool body 4. In at least one variation, the support 8 is a support cylinder 9 extending laterally away (+x direction) from the tool body 4. And in some variations a support surface provided by the support cylinder 9 is a convex shaped surface. Furthermore, the support cylinder 9 is terminated at a distal end 10 with a terminating disk 11 having a diameter greater than the support cylinder 9 such that the support 8 is delimited laterally (x direction) by the tool body 4 and the terminating disk 11 as shown in FIG. 1(c).

The support 8 is used to support and to hold the tool body 4 during assembling of the window pane 3 into the window frame 2. For example, and as shown in FIGS. 1(a)-1(c), the support 8 supports the tool body at or on a first edge 12 of the window pane 3. The first edge 12 is assigned or positioned relative to an opposing (opposite) frame part 13 of the window frame 2 such that the first edge 12 is received in the frame part 13 when the window pane 3 is closed (i.e., raised).

Furthermore, FIG. 1 shows a tool arm 15 which is held on or coupled to the tool body 4 and which extends substantially along a longitudinal axis 14 of the tool arm 15. At a distal end 16 of the tool arm 15 a distance gauge 17 extends from the tool arm 15 substantially transverse to the longitudinal axis 14. As can be seen in FIGS. 1(a) and 1(b), the distance gauge 17 is inserted between a second guided edge 18 (also referred to herein simply as "second edge 18" or "second edge") of the window pane 3 and a pane guide part 19 during the assembly of the window pane 3 into the window frame 2. Particularly, the distance gauge 17 guides the second guided edge 18 of the window pane 3 within the window frame 2 and sets a gap 20 having a predefined width (x direction) between the second edge 18 of the window pane 3 and a guide side of the pane guide part 19, thereby enhancing a parallel orientation of the upper pane edge 12 (i.e., the first pane edge 12) with respect to the upper frame part 13.

Furthermore, the assembly tool 1 shown in FIG. 1 has a push arm 21 which is held on or coupled to the tool body 4 so as to be displaceable relative to the tool body 4. In some variations, the push arm 21 is configured as a push cylinder. The push arm 21 can be displaced linearly relative to the tool body 4 in a pushing direction 22 in order to clamp the tool body 4, during the assembly operation, between the first edge 12 of the window pane 3 and the frame part 13 of the window frame 2 with a predefined clamping force. In some variations, the push arm 21 is actuated by an external force (e.g., a push arm external force).

In at least one variation, the external force actuation of the push arm 21 is provided by a motor 'M', which is received in the second U limb 6 and transmits a drive force thereof to the push arm 21, received in a linearly displaceable manner in the first U limb 5, by way of a deflecting unit 'D' which is received in the connecting limb 7.

In addition, in the case of the assembly tool 1 shown in FIGS. 1(a)-1(c), the tool arm 15 is held on or coupled to the tool body 4 so as to be pivotable about a pivot axis 23 in a direction of rotation 24. Also, the pivot axis 23 represents a transverse axis of the tool body 4 and the tool arm 15 can, for the pivoting movement thereof, likewise be pivoted in a manner actuated by an external force (e.g., a tool arm external force), for example via a pivot motor 'P' which is arranged on the pivot axis 23. The pivotability of the tool arm 15 permits, on the one hand, the external force-actuated introduction of the distance gauge 17 for the formation of the gap 20 and, on the other hand, if desired, likewise an external force-actuated removal of the distance gauge 17 from the gap 20 after adjustment of the window pane 3 in the window frame 2 has been completed.

In some variations, and as shown in FIGS. 1(a)-1(c), two handles 25 are attached laterally to the tool body 4 and a respective button 26, 27 is arranged on each handle 25. In at least one variation the button 26 is provided for activating and deactivating the external force actuation, and the button 27 is configured as an emergency stop button in order to deactivate the external force actuation, for example in an emergency.

In some variations an adapter block 28 is attached to the push arm 21 as shown in FIGS. 1(a)-1(c). For example, and as shown in FIG. 1(c), the adapter block 28 has a cross-sectional profile which corresponds to (i.e., complimentary to) the frame part 13 in order to provide a good fit between the adapter block 28 and the frame part 13 as a clamping force is provided by the push arm 21. And in at least one variation the adapter block 28 is fastened to the push arm 21 in a releasable manner such that the assembly tool 1 can be used for the assembly of a multiplicity of different window frames 2.

Figure 2:
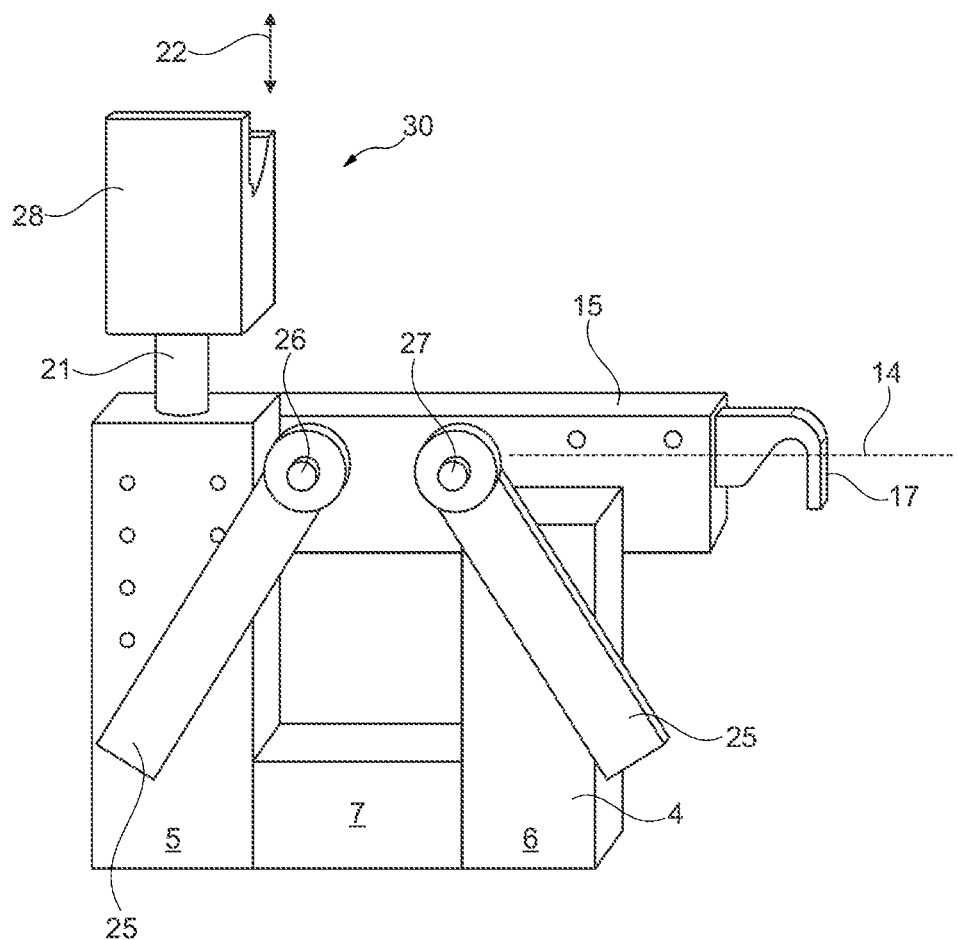
FIG. 2 shows a side view of an assembly tool according to another form of the present disclosure.

Referring to FIG. 2, a side view of an assembly tool 30 according to another form of the present disclosure is shown. In contrast to the assembly tool 1 illustrated in FIG. 1, in the assembly tool 30, the tool arm 15 is held on the tool body 4 in a rotationally fixed manner.

The assembly tool according to the teachings of the present disclosure is not limited to the forms or variations disclosed herein, but rather also encompasses identically acting further variations and forms which result from technically expedient further combinations of the features of the assembly tool which are described herein. In particular, the features and combinations of features mentioned above herein in the general description and the description of the figures and/or shown in the figures alone can be used not only in the respective combinations specified explicitly herein but also in other combinations or on their own without departing from the scope of the present disclosure.

In at least one variation, the assembly tool according to the teachings of the present disclosure is used for the assembly of a window pane in a window frame, the window pane being received in a displaceable manner in the window frame of a vehicle. And in some variations the window frame is a window frame of a vehicle door.

Unless otherwise expressly indicated herein, all numerical values indicating mechanical/thermal properties, compositional percentages, dimensions and/or tolerances, or other characteristics are to be understood as modified by the word "about", "approximately" or "substantially" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An assembly tool for assembly of a window pane in a window frame of a vehicle, the window pane being received in a displaceable manner in the window frame, the assembly tool comprising:
   a tool body having a support for supporting and holding the tool body on a first edge of the window pane;
   a tool arm having a longitudinal axis substantially parallel to the first edge, the tool arm comprising a distal end with a distance gauge extending transverse to the longitudinal axis, wherein the distal end is configured for insertion between a second edge of the window pane and a pane guide part of the window frame which guides the second edge of the window pane within the window frame; and
   a push arm displaceable relative to the tool body and configured for clamping the tool body between the first edge of the window pane and a frame part of the window frame which receives the window pane in the displaceable manner, wherein the push arm is actuated by a push arm external force.

2. The assembly tool according to claim 1, wherein the tool arm is pivotable about a pivot axis.

3. The assembly tool according to claim 1, wherein the tool arm is actuated by a tool arm external force.

4. The assembly tool according to claim 1, wherein the tool arm is actuated by a tool arm external force from a pivot motor arranged on a pivot axis.

5. The assembly tool according to claim 1, wherein a support surface of the support is a convex surface.

6. The assembly tool according to claim 1, wherein the support is a support cylinder extending laterally from the tool body.

7. The assembly tool according to claim 6, wherein the support cylinder comprises a distal end with a terminating disk having a diameter greater than a diameter of the support cylinder.

8. The assembly tool according to claim 1, wherein the tool arm comprises the support, wherein the support is configured to support and hold the tool arm on the first edge of the window pane.

9. The assembly tool according to claim 1, wherein the tool body is a U-shaped tool body comprising two free U limbs and a connecting limb connecting the two free U limbs.

10. The assembly tool according to claim 9, wherein the push arm is disposed in one of the two free U limbs.

11. The assembly tool according to claim 10, wherein the push arm is displaceable relative to the one of the two free U limbs.

12. The assembly tool according to claim 11 further comprising a drive motor disposed in another of the two free U limbs, wherein the drive motor is configured to provide the push arm external force to the push arm.

13. The assembly tool according to claim 12 further comprising a deflecting unit disposed in the connecting limb, wherein the deflecting unit couples the drive motor to the push arm in a drive force-transmitting manner.

14. The assembly tool according to claim 1, wherein at least one handle is attached laterally to the tool body.

15. The assembly tool according to claim 14 further comprising a button on the at least one handle, wherein the button is configured for activating the push arm external force.

16. An assembly tool for assembly of a window pane in a window frame of a vehicle, wherein the window pane is received in a displaceable manner in the window frame, the assembly tool comprising:
    a tool body having a support for supporting and holding the tool body on a first edge of the window pane;
    a tool arm having a longitudinal axis, the tool arm comprising a distal end with a distance gauge extending transverse to the longitudinal axis, wherein the distal end is configured for insertion between a second edge of the window pane and a pane guide part of the window frame which guides the second edge of the window pane within the window frame; and
    a push arm displaceable relative to the tool body and configured for clamping the tool body between the first edge of the window pane and a frame part of the window frame which receives the window pane in the displaceable manner, wherein the push arm is actuated by a push arm external force,
    wherein the tool arm comprises the support, wherein the support is configured to support and hold the tool arm on the first edge of the window pane.

17. The assembly tool according to claim 16, wherein the tool arm is pivotable about a pivot axis.

18. The assembly tool according to claim 17, wherein the tool arm is actuated from a pivot motor arranged on the pivot axis.

19. An assembly tool for assembly of a window pane in a window frame of a vehicle, wherein the window pane is received in a displaceable manner in the window frame, the assembly tool comprising:
- a tool body having a support for supporting and holding the tool body on a first edge of the window pane;
- a tool arm having a longitudinal axis, the tool arm comprising a distal end with a distance gauge extending transverse to the longitudinal axis, wherein the distal end is configured for insertion between a second edge of the window pane and a pane guide part of the window frame which guides the second edge of the window pane within the window frame, and the tool arm is pivotable about a pivot axis, wherein the tool arm is actuated by a tool arm external force from a pivot motor arranged on the pivot axis; and
- a push arm displaceable relative to the tool body and configured for clamping the tool body between the first edge of the window pane and a frame part of the window frame which receives the window pane in the displaceable manner, wherein the push arm is actuated by a push arm external force.

20. The assembly tool according to claim 19, wherein the support is a support cylinder extending laterally from the tool body and the support cylinder comprises a distal end with a terminating disk having a diameter greater than a diameter of the support cylinder.

\* \* \* \* \*